United States Patent [19]

Kraus

[11] 4,135,895
[45] Jan. 23, 1979

[54] PUMP CONSTRUCTION FOR THE TREATMENT OF GASES WITH A SORBENT MATERIAL

[75] Inventor: Thaddäus Kraus, Triesen, Liechtenstein

[73] Assignee: Balzers Patent- und Beteiligungs-Aktiengesellschaft, Liechtenstein

[21] Appl. No.: 828,183

[22] Filed: Aug. 26, 1977

[30] Foreign Application Priority Data

Sep. 7, 1976 [CH] Switzerland ............... 011322/76

[51] Int. Cl.² ............................................. B01D 53/06
[52] U.S. Cl. ........................................ 55/181; 55/208; 55/390
[58] Field of Search ............... 55/77, 78, 79, 99, 181, 55/208, 390, 474; 266/211; 417/51

[56] References Cited

U.S. PATENT DOCUMENTS

| | | | |
|---|---|---|---|
| 2,544,214 | 3/1951 | Berg | 55/198 |
| 2,684,931 | 7/1954 | Berg | 55/79 X |
| 2,799,383 | 7/1957 | Spurlin | 198/391 |
| 2,992,065 | 7/1961 | Feustel et al. | 55/79 X |
| 3,093,465 | 6/1963 | Latta | 55/78 X |
| 3,211,361 | 10/1965 | Flinn | 55/79 X |
| 3,760,565 | 9/1973 | Fish | 55/79 X |
| 3,867,114 | 2/1975 | Doig | 55/77 |
| 3,981,699 | 9/1976 | Molitor | 55/208 |

*Primary Examiner*—Robert H. Spitzer
*Attorney, Agent, or Firm*—McGlew and Tuttle

[57] ABSTRACT

A pump for the treatment of gases with a sorbent material in an evacuated chamber comprises a housing which has a plurality of stacked plates which define a continuous upwardly extending path for the sorbent material which is made up of successive spirals. At least some of the spirals are spaced vertically apart to define a sorption zone permitting the passage of gases to be treated over the sorbent material. In addition the stacked plates also define a closed path in the housing leading from the sorption zone and out of the housing for discharing desorbed gases. The housing is vibrated by a vibration drive applied to effect upward movement of the sorbent material and a downcomer pipe or return pipe extends through the plates for returning the sorbent material from the upper portion of the path back to the location of the bottom of the sorbent material path. The sorbent material is continuously moved upwardly through the housing on the plates by vibrating the housing to effect such movement. Gases are circulated over the sorbent material for their treatment as the sorbent material is moved upwardly along the path and subsequently returned back to the lower portion of the path.

10 Claims, 8 Drawing Figures

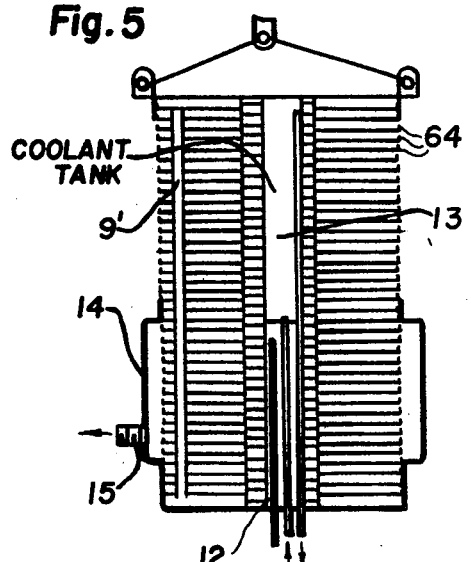
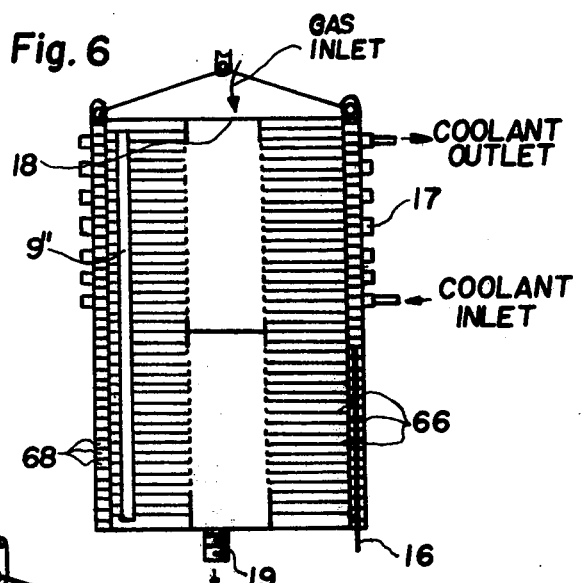
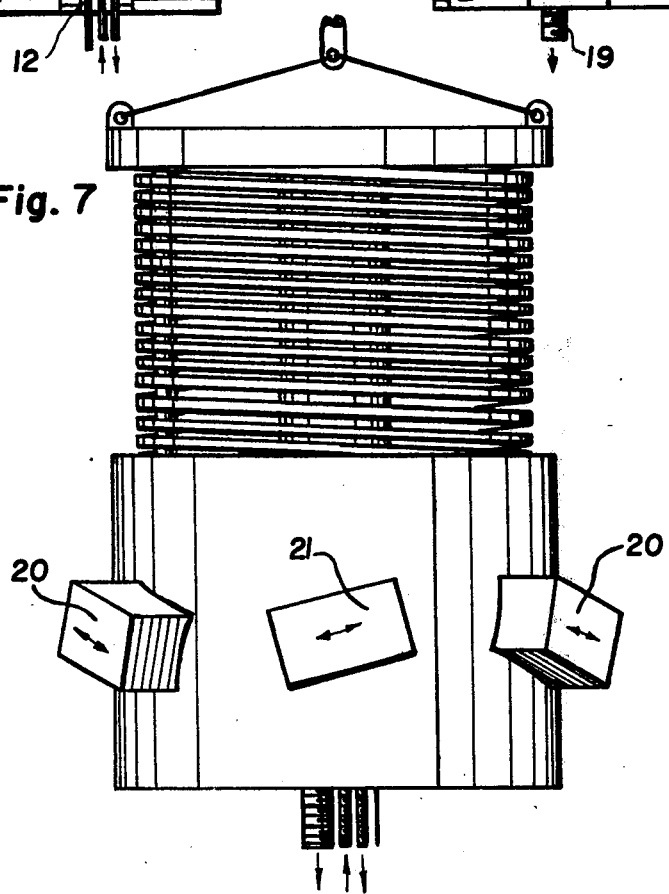

PUMP CONSTRUCTION FOR THE TREATMENT OF GASES WITH A SORBENT MATERIAL

BACKGROUND OF THE INVENTION

1. Field of the Invention

This invention relates in general to an apparatus for treating gases particularly to a new and useful sorption vacuum pump for treatment of gases with a sorbent material in an evaporated chamber wherein the sorbent material is moved by vibration of the housing and the gases may be circulated over the moved sorbent material.

2. Description of the Prior Art

Sorption processes for evacuating, where a sorbent is charged into the space to be evacuated and discharged again after loading with gas, have been proposed on many occasions before. By the term sorbent are to be understood in the following all substances which are able to absorb gases, whether involving adsorption, capillary condensation, solution processes or chemical reactions.

Sorption processes in which a specific quantity of a sorbent is charged once into the space to be evacuated have proved very satisfactory, but they are limited to small volumes or short operating times. Proposals for performing this process continuously have not found acceptance in the practice because the efficiency of such equipments was poor, perhaps this is because the transport mechanism for introduction of the sorbent into the space to be evacuated caused the gases to become entrained into the container.

In U.S. Pat. No. 2,544,214 a method has been described for the evacuation of gases and vapors by means of a sorbent which is passed continuously via air locks into the space to be evacuated and out again after loading with gas, and where the sorbent is passed through the space to be evacuated by means of a vibratory conveyor arrangement, that is, without using a moving carrier. Preferably a regenerable granular sorbent is circulated and regenerated outside the space to be evacuated, e.g. by heating. Several sorption pumps of this kind can be connected in series if a particularly high vacuum is to be attained. Also, vibratory conveyors of different design can be used. For this patent it is known, for example, to provide for such a pump a vibratory transport path in the form of a spiral chute on the inside of a hollow cone. The pumps used can be operated with the full efficiency of the sorbent used, because a carrier moving with the sorbent through the space to be evacuated does not exist. The vibratory transport path moves only the sorbent, not itself.

SUMMARY OF THE INVENTION

The invention provides a new sorption pump especially suitable for the practice of the mentioned process, which makes possible in a small space, a larger exchange surface than in previous sorption pumps, and it is easy and inexpensive to manufacture, and can be adapted to a variety of operating conditions.

The sorption pump or transporter according to the invention, has a vibratory conveyor arrangement comprising a pump zone and a regeneration zone. The granular sorption medium is conveyed in circulation into the pump zone and, after loading with the gas to be pumped, into the regeneration zone and thence again into the pump zone. The pump zone and the regeneration zone of the vibratory conveyor arrangement are each composed of a plurality of identical shaped parts arranged one above the other in a stack.

Preferably the shaped parts for the pump are formed with an inner ring and the shaped parts for the regeneration zone with an outer ring, which carries a section of the spiral transport path for the sorption medium. The construction of the transport device from single identical shaped parts offers, not only the advantage of low-cost manufacture, e.g. of aluminum casting, but above all, the advantage especially important for vacuum systems that the size of the pump can easily be adapted to the respective requirements by using for each of the two zones a number of floor type or stacked structural parts corresponding to the respective application.

Accordingly it is an object of the invention to provide a method of using the apparatus of the invention for treating gases in an evacuated space in a housing which has an upwardly extending path therein for the movement of sorbent material thereover and which comprises placing sorbent material at the lower end of the path, vibrating the housing so as to move the material upwardly along the path and circulating the gases to be treated over the sorbent material as it travels upwardly on the path and returning the sorbent material from the upper part of the path back to the lower end of the path.

A further object of the invention is to provide a pump for the treatment of gases with a sorbent material in an evacuated chamber which comprises a housing which has a plurality of stacked plates which define a continuous upwardly extending path for sorbent material made up of successive spirals wherein at least some of the spirals are spaced apart to define a sorption zone above the material over which the gases are passed and wherein the housing is vibrated to move the sorption material up along the path and means are provided to return it to the bottom of the path.

A further object of the invention is to provide a sorption pump which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there are illustrated preferred embodiments of the invention.

BRIEF DESCRIPTION OF THE DRAWINGS

In the drawings:

FIG. 5 is a view similar to FIG. 1 on a smaller scale showing another embodiment of the invention;

FIG. 6 is a view similar to FIG. 1 of another embodiment of the invention; and

FIG. 7 is an elevational view of the pump shown in FIG. 1 having vibratory drive indicated thereon schematically.

DETAILED DESCRIPTION OF PREFERRED EMBODIMENTS

Figure 1:
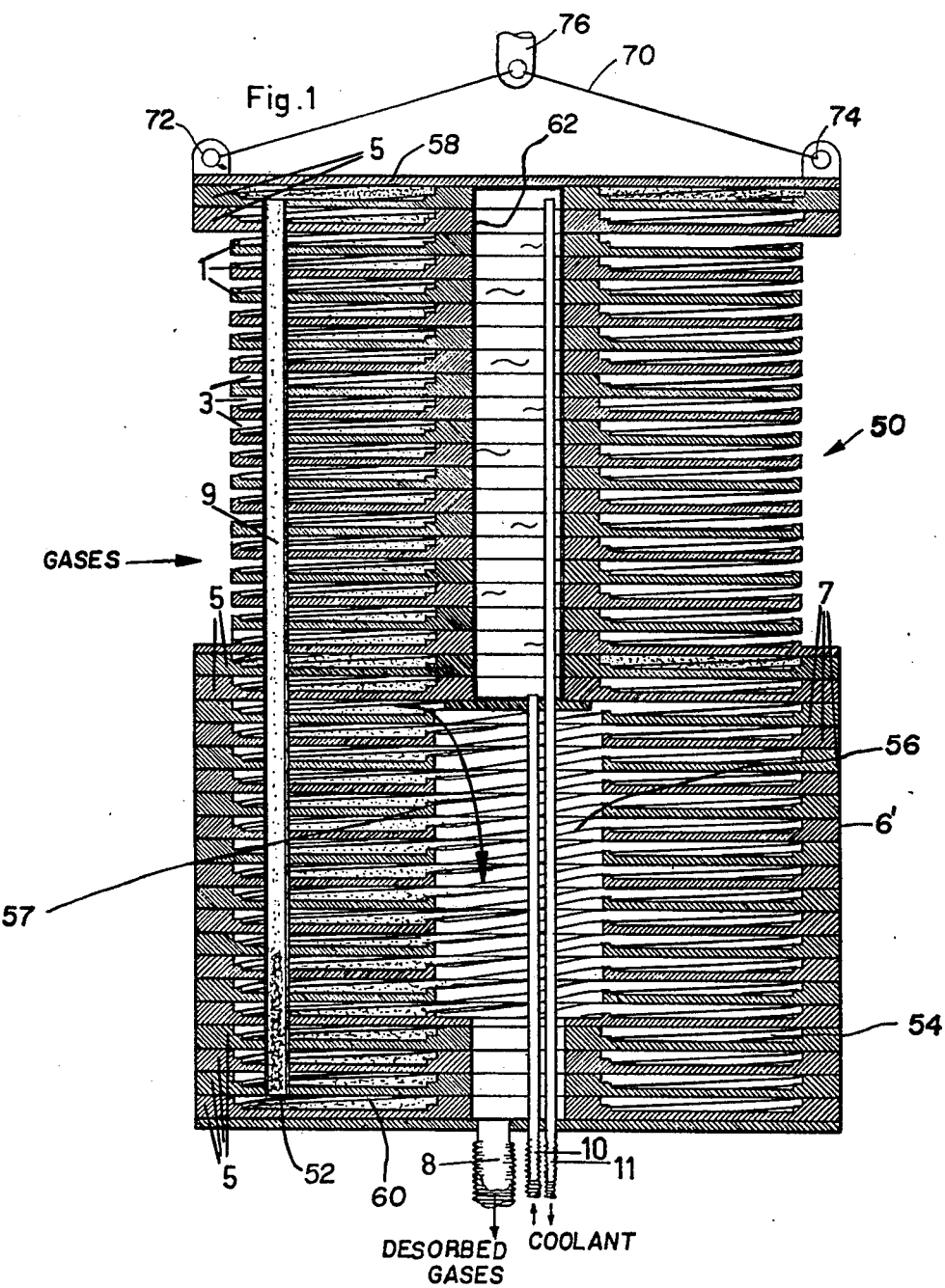
FIG. 1 is a vertical sectional view of a sorption pump constructed in accordance with the invention.

Referring to the drawings in particular, the invention embodied therein comprises a pump housing generally designated 50 for the treatment of gases with a sorbent material 52 which in circulated along a continuous spiral path 54 which are formed of a plurality of stacked shaped parts or plates 1 and 7 which may be formed of metal castings.

The pump according to FIG. 1 comprises in its upper part seventeen shaped parts or plates 1 arranged one above the other like floors or layers in a vertical stack. Each part 1 forms a part of an approximately spiral conveyor trough 2 (FIG. 2) of a vibratory conveyor. In trough 2 the sorption medium moves upward during the pumping operation, the gases to be pumped having access through the gaps 3 between the shaped parts 1 in the upper part or sorption zone of the pump.

Figure 2A:
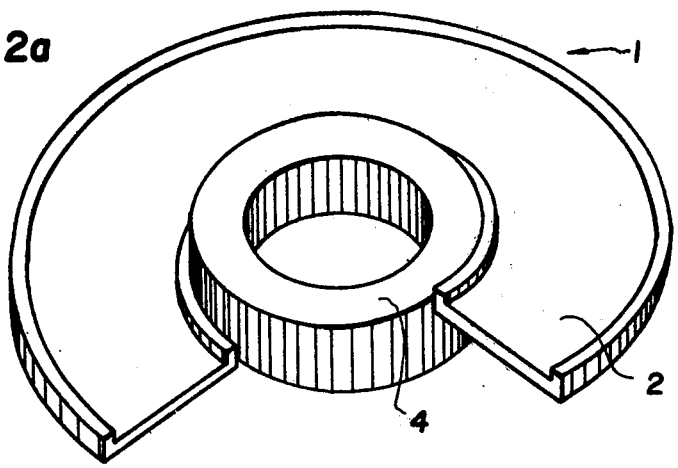
FIG. 2a is an enlarged perspective view of a plate used in defining a portion of the spiral path of the device shown in FIG. 1.
Figure 2B:
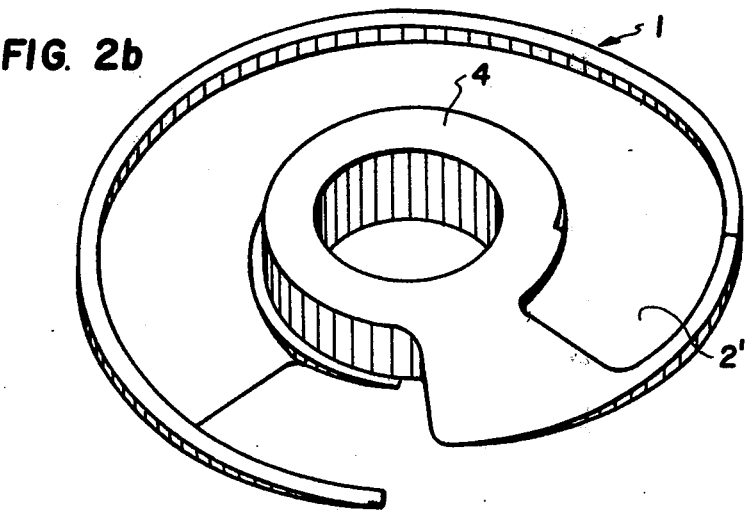
FIG. 2b is a view similar to FIG. 2a of another embodiment of the invention.

There are several possibilities of design for the shaped parts 1, of which two are illustrated in FIGS. 2a and 2b. A number of such similar shaped parts suitable for a given application are placed one on the other, forming a closed conveyor trough for the upper part of the pump, in which the sorption of the gases to be pumped takes place. In case 2a the conveyor vertically adjacent troughs 2 abut, in case 2b the troughs 2' overlap. In both cases the shaped parts 2 and 2' have an inner ring 4, which carries the respective section of the spiral conveyor trough for the sorbent material.

Figure 3:
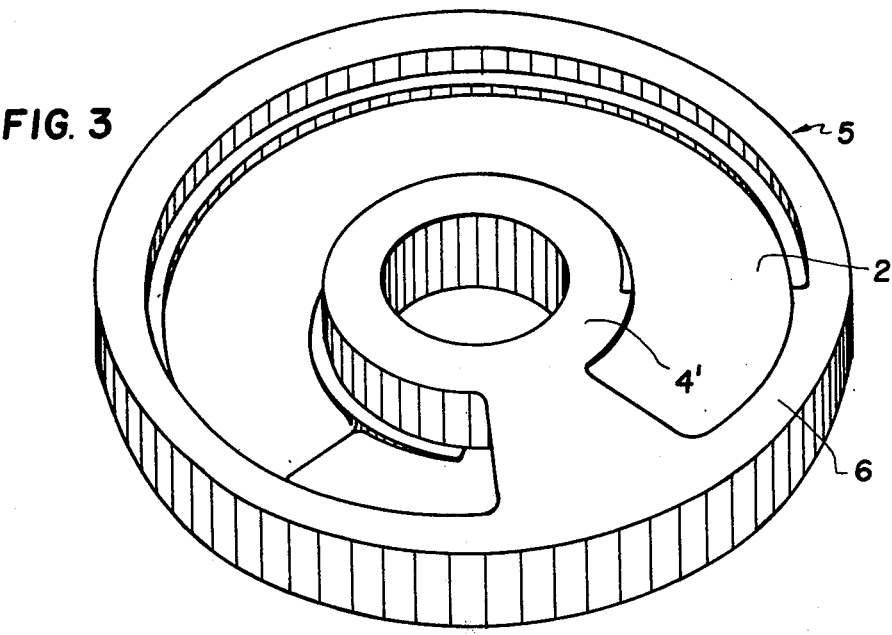
FIG. 3 is a view similar to FIG. 2a of still another embodiment of the invention.
Figure 4:
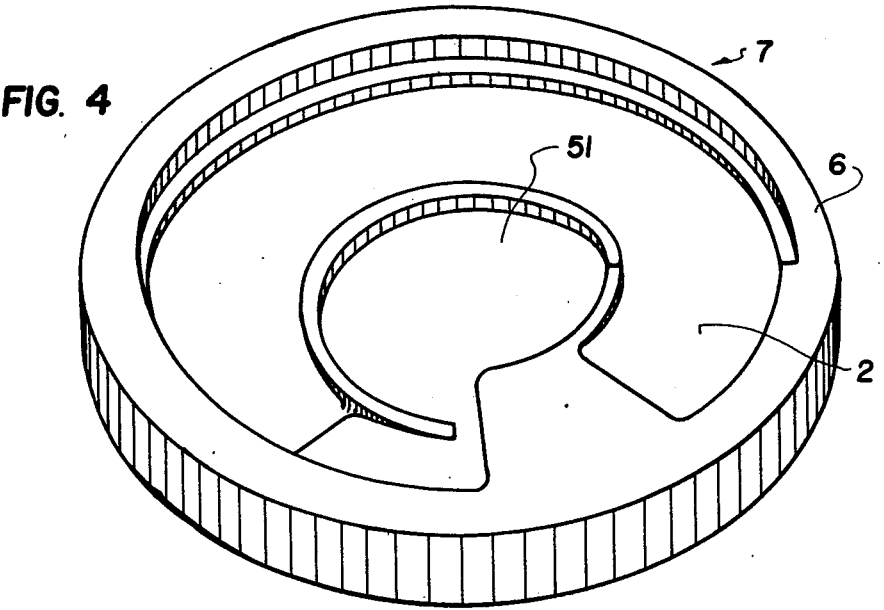
FIG. 4 is a view similar to FIG. 2a of still another embodiment of the invention.

Contiguous on both sides of the stack formed on the described shaped parts 1 is a shaped part or intermediate part 5 for each (FIG. 3) which has the function to close off the pump zone from the regeneration zone. For this purpose the shaped part 5 has an outer ring 6 in addition to an inner ring 4'. In the operation of the pump the seal is obtained by said rings and the sorbent itself.

The lower portion of the pump illustrated in FIG. 1 comprises thirteen identical shaped parts 7, which, however, differ from the shaped parts 1 in that they have outer substantially cylindrical rings 6' which close together or abut adjoining their outer circumference. The parts 7 are supporting rings for the associated parts of the conveyor trough and have an opening 56 in their central part. In this lower portion of the pump the sorbent 52 is desorbed by heating and hence regenerated before it passes into the upper pumping portion. For heating there serves a heating cartridge, which is inserted in the cavity 56 formed by the central apertures 51 of the shaped parts 7. The desorbed gas as shown by arrow 57 is pumped off through the line 8 by a backing pump (not shown).

FIG. 1 further shows the return of the sorbent 52, gasladen after the pumping, through a down pipe or sorbent material return conduit 9 which leads back from an uppermost step 58 of the vibratory conveyor to a lowermost step 60. The pipe 9 extends through aligned openings of the plates, which are not shown in FIGS. 2a and 2b. Since the sorbent heated after the regeneration must be cooled again for the pumping process, cooling is provided in the region of the pump zone, that is, in the upper portion. For this, the cavity 62 formed by central openings in the upper shaped parts is used. In the embodiment, the cavity 56 is traversed by a cooling medium for which purpose an inlet conduit 10 and an outlet conduit 11 for the circulation of the cooling medium are provided. Alternatively the cavity 56 comprises a coolant storage tank, e.g. a tank for liquid nitrogen, and it is connected with a fill-up device (not shown).

FIGS. 5 and 6 show schematically further design possibilities of a pump according to the invention. The diagram of FIG. 5 concerns an arrangement wherein identical shaped parts 64 can be used for the pump and regeneration zones. As can be seen, they each produce in the upper as well as in the lower portion a closed-off cavity, the lower having a heating device 12, the upper being designed as coolant tank 13. In the upper portion the gases to be pumped have free access to the sorbent, while the gases desorbed in the lower portion during regeneration are removed through the collecting space formed as outer jacket 14 by means of the line 15 connected thereto.

FIG. 6 also shows an arrangement with identical shaped parts 66 for the pump and regeneration zones, but, at variance with FIG. 5, with closely adjoining or abutting support rings 68 at the outer circumference and with inlet of the gases to be pumped and outlet of the desorbed gases in the central portion of the arrangement. In this example means for circulating a heating medium or heater 16 and means for circulating a coolant 17 are accommodated in an outer jacket. The connection of the gases with the space to be evacuated exists via the aperture 18, the discharge of the desorbed gases occurs through line 19.

The drive of the vibratory conveyor to be used under the present invention occurs in a manner known in itself, as described for example in "Chemie Ing. Technik" 48 (1976) No. 5, pages A 276 to A 278, "CZ Chemie Technik" 2nd volume, 1973, No. 11, pages 415 to 418, Ullmanns Enzyklopadie der technischen Chemie, Vol. 3, pages 138/139, Verlag Chemie, Weinheim, Berstrasse, 1973. For the propagation of the sorbent in the conveyor trough a helical drive vibration is necessary. Upward movement takes place when the pitch or inclination of the helical drive vibration is greater and, downward movement takes place when said pitch or inclination is smaller than the pitch inclination of the conveyor trough. It is advantageous to design the drive so that selectively an upward or downward movement can be obtained. The latter, in fact, may be useful for drawing the entire sorbent present in the pump zone into the hot regeneration zone before opening the vacuum system. As FIG. 7 shows, preferably several vibration drive elements are distributed over the circumference of the pump housing for this purpose. For example three drives designated 20 of which only two are visible in FIG. 7 and are provided for conveying in upward direction and three drives (of which only one - 21 - is visible in FIG. 7) are provided for conveying in downward direction. The housing 50 is supported by a cable 70 secured to brackets 72 and 74 and connected to a suspension 76 of the vibration drive.

While specific embodiments of the invention have been shown and described in detail to illustrate the application of the principles of the invention, it will be understood that the invention may be embodied otherwise without departing from such principles.

What is claimed is:

1. A pump for the treatment of gases with a sorbent in an evacuated chamber, comprising a housing having a plurality of stacked plates defining a continuous upwardly extending path of successive spirals for the sorbent material, the sorbent material being distributed along at least a portion of the path, at least some of said spirals being spaced apart to define a sorption chamber permitting the passage of gases to be treated over the sorbent material, said stacked plates further defining a closed path in said housing leading from said sorption chamber and out of said housing for discharging the sorbed gases, drive means for vibrating said housing applied to effect an upward movement of said sorbent material along said path, and return means for the sorbent material extending downwardly from a location adjacent the top of said path to the location adjacent the bottom of said path, said stacked plates comprising central hub portions which interfit and have an opening therein defining a cooling chamber and have spiral path forming outer portions which are spaced apart at their peripheries for the passage of a gas therethrough.

2. A pump according to claim 1, wherein said stacked plates include additional plate portions having outer ring parts which interfit and close off the outer peripheries of said plate portions and include spiral path forming inner portions for the sorbent material and a central opening in a stack of said plates forming a central heating chamber located below said cooling chamber.

3. A sorption vacuum pump according to claim 2, including means for circulating a coolant to said cooling chamber.

4. A sorption vacuum pump comprising a vertical stack of a plurality of first lower plates having outer peripheral ring portions which are interengaged and spiral inner portions which define a portion of an upward spiral path for sorption material and with an inner open space defining a heating chamber portion, the sorption material being distributed along at least a portion of the path, a plurality of second plates stacked on said first plates and having outer and inner ring portions which are interfitted together to close off each outer and inner end with an intermediate spiral path continuing upwardly from the spiral path defined by said first plates and a third set of plates having only inner ring portions which interfit and close off the inner ends and have spiral path portions which connect to the lower spiral path portions of said first and second plates, the inner rings fitting together to define a central cooling chamber along with said second plates, means separating said cooling chamber from said heating chamber defined by said first plates, the spaces between said third plates defining a path for the passage of gases to be desorbed by the sorption material therein and the spiral path being provided for the sorbent material, a return conduit extending from the uppermost one of said plates to the lowermost one of said plates for returning sorbent material which is fed to the uppermost plate, means for vibrating said housing to cause movement of said sorbent material upwardly along said spiral path of said first, second and third plates.

5. A sorption vacuum pump according to claim 4, including means for circulating a cooling liquid into and out of said cooling chamber.

6. A sorption vacuum pump according to claim 5, wherein said first, second and third plates have overlapping portions.

7. A sorption vacuum pump according to claim 5, wherein said first, second and third plate portions are constructed and arranged to abut against each other at the locations of the beginning and the ends of each individual spiral path defined thereby.

8. A sorption vacuum pump according to claim 4, having a jacket surrounding said first plates for the passage of the temperature control medium therethrough.

9. A sorption vacuum pump according to claim 4, wherein said drive means for vibrating said housing includes a plurality of vibrating elements arranged around the periphery thereof.

10. A sorption vacuum pump according to claim 4, wherein said plates are metal castings.

* * * * *